(12) United States Patent
Minase et al.

(10) Patent No.: US 6,426,873 B1
(45) Date of Patent: Jul. 30, 2002

(54) DATA CONVERSION APPARATUS WITH SAFETY CIRCUIT

(75) Inventors: Minoru Minase, Iruma; Susumu Niinuma, Fujimi; Hiroomi Watanabe, Iruma, all of (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/555,288

(22) PCT Filed: Oct. 1, 1999

(86) PCT No.: PCT/JP99/05409

§ 371 (c)(1),
(2), (4) Date: May 30, 2000

(87) PCT Pub. No.: WO00/21084

PCT Pub. Date: Apr. 13, 2000

(30) Foreign Application Priority Data

Oct. 5, 1998 (JP) .......................................... 10-299122

(51) Int. Cl.⁷ .............................................. H05K 05/02
(52) U.S. Cl. ...................... 361/686; 361/686; 361/726; 361/727; 361/685; 439/928.1; 312/223.1; 312/223.2
(58) Field of Search .......................... 361/686, 725–728, 361/687–685; 439/53, 152, 157, 928.1; 312/223.1, 223.2, 222, 215

(56) References Cited

U.S. PATENT DOCUMENTS

| | | | |
|---|---|---|---|
| 5,477,403 A | * 12/1995 | Strickler | ..................... 360/105 |
| 5,532,889 A | * 7/1996 | Stfansky et al. | ......... 360/97.01 |
| 5,844,866 A | 12/1998 | Fujimoto et al. | ............. 369/50 |
| 5,947,572 A | * 9/1999 | Chang | ..................... 312/332.1 |
| 6,025,988 A | * 2/2000 | Yan | ............................. 361/685 |
| 6,243,355 B1 | * 6/2001 | Ikebe et al. | ................. 369/291 |
| 6,246,654 B1 | * 6/2001 | Omori et al. | .............. 369/75.2 |

FOREIGN PATENT DOCUMENTS

| | | |
|---|---|---|
| JP | 5-342732 | 12/1993 |
| JP | 6-131834 | 5/1994 |
| JP | 8-263911 | 10/1996 |
| JP | 9-223349 | 8/1997 |
| JP | 11-31351 | 2/1999 |

\* cited by examiner

*Primary Examiner*—Gerald Tolin
*Assistant Examiner*—David Foster
(74) *Attorney, Agent, or Firm*—Woodcock Washburn LLP

(57) ABSTRACT

A CD-ROM drive (2) is disclosed which has a safety circuit (40). The safety circuit (40) includes a NOR gate (51) having one input connected to a disk motor drive control signal terminal (48) of a system controller (31), and another input connected to the output ($P_1$) of a sensor (13). The system controller (31) puts out a signal that goes low for activating a motor (18) and high for inactivating the same. The motor (18) is set into rotation when the NOR gate (51) is high, and out of rotation when the NOR gate is low. When the sensor (13) is high, however, the NOR gate (51) goes low, stopping the motor (18), regardless of the other input to the NOR gate from the system controller (31).

9 Claims, 11 Drawing Sheets

DATA CONVERSION APPARATUS WITH SAFETY CIRCUIT

TECHNICAL FIELD

The present invention relates to a data transfer apparatus having a safety circuit for safe operation of drive means for data storage media such as CD-ROMs, that is, compact disks used as read-only memories.

BACKGROUND ART

The CD-ROM drive disclosed in the U.S. Pat. No. 5,844,866 represents an example of data transfer apparatus. The CD-ROM drive lends itself to use as an external storage of a personal computer. The CD-ROM for use with a personal computer has a tray built into it, for accommodating a CD-ROM (hereinafter to be also referred to simply as disk). In small-size CD-ROM drives for small-size personal computers such as those of the notebook size, an optical pickup for reading data on the disk, a disk drive motor for imparting rotation to the disk, and a feed motor or sled motor for feedling the optical pickup radially of the disk are all mounted to the tray, which is movable between a first position, in which it protrudes from the housing of the personal computer, and a second position in which it lies within the housing.

When the tray is in the first position, for loading or unloading the disk on or from the disk drive motor, the disk-mounting portion of the disk drive motor and the objective lens of the optical pickup are both exposed. Therefore, should the disk drive motor, and hence the disk itself, be left in rotation when the tray is pulled out of the computer housing, they might do harm to the user or operator. This hazard is avoided by incorporating in the CD-ROM drive a tray position sensor for ascertaining whether or not the tray is in the second position with respect to the computer housing. The disk is driven only when the sensor detects tray insertion into the computer housing.

The CD-ROM drive includes a microcomputer, or a controller including a central processor unit, for controlling the rotation of the disk drive motor. If the eject button is operated, or an eject command is supplied from the master, when the disk drive motor is in rotation under the direction of the controller, the controller will respond by setting the disk drive motor out of rotation before causing the eject means to eject the tray. The eject means when so actuated will cause the tray to protrude slightly from the housing, permitting the user to manually pull the tray to the first position for a change from one disk to another.

Thus, as long as the controller is functioning normally, the disk drive motor and the disk will go of rotation before the tray is pulled out. There will therefore be no danger to the operator.

The CD-ROM drive is additionally equipped with emergency eject means for compulsorily ejecting the tray when the latter is not normally ejectable by the eject means. The emergency eject means is such that an emergency hole is formed in the front panel of the CD-ROM drive for insertion of a pin thereby to unlock the means locking the tray in the second position. Trying to emergency eject the tray when the CD-ROM drive is electrically powered on, the operator will be subject to no danger as long as the controller is functioning properly. That is because upon compulsory tray ejection, the tray sensor will put out a signal indicative of that fact, to which the controller will respond by terminating the rotation of the disk drive motor, thereby assuring the safety of the operator.

Although not frequently, however, the controller may malfunction and endanger the operator. The disk drive motor may then be left in rotation after actuation of the eject button or emergency ejection. The motor will then revolve on the ejected tray, potentially doing harm to the operator.

Another possible trouble is that the controller, either itself malfunctioning or under the influence of external noise, may deliver a drive command to the disk drive motor while the tray is ejected. Then the motor will start rotation, driving the ejected disk at the risk of injury to the operator.

It should also be taken in consideration that the laser and the pickup feed motor are also under the control of the controller. The emission of the laser beam is automatically terminated, and the feed motor set out of rotation, upon tray ejection. The malfunctioning controller may keep the laser beam emitted, and the feed motor running, with the tray ejected. The operator may suffer injury from these causes, too.

The foregoing problems of the CD-ROM drive also exist with the digital video disk (DVD) drive, the DVD-ROM drive, the magnetic disk drive, and so forth.

It is therefore an this invention to provide a data transfer apparatus enhanced safety.

DISCLOSURE OF INVENTION

The data transfer apparatus according to the invention comprises drive means for driving a replaceable data storage medium, support means supporting said drive means, a cover covering said drive means and the data storage medium mounted to said drive means, positioning means for selectively positioning said support in a first position, where said drive means is exposed from said cover so as to permit the data storage medium to be mounted to and dismounted from said drive means, and a second position where said drive means is covered by said cover, a position sensor for sensing whether said support is in said second position or not, drive command generator means for generating a command for driving said drive means, control means connected to said drive means and said position sensor and said drive command generator means for setting said drive means in operation when said position sensor provides a signal indicating that said support is in said second position and, at the same time, when said drive command generator means generates the drive command for said drive means, and for setting said drive means out of operation when said position sensor provides a signal indicating that said support is not in said second position, and safety circuit means connected to said control means and said drive means and said position sensor for providing to said drive means a signal for stopping said drive means regardless of an output from said control means when said position sensor provides a signal indicating that said support is not in said second position.

Data storage media envisaged by this invention are those media which permit data to be written on and/or read therefrom, examples being those in disk form such as optical disks, magneto-optical disks, and magnetic disks, as well as those in tape form.

If, in the data transfer apparatus according to the present invention, the output from the control means indicates the operation of the drive means when the position sensor indicates that the support is not in the second position, the safety circuit means will compulsorily set the drive means out of operation, overriding the output from the control means. Operator safety is thus assured as the drive means is compulsorily prevented from operation when the drive means is uncovered.

Preferably, the position sensor included in the data transfer apparatus according to the present invention should include a switch that assumes a first state (on or off) when said support is in said second position, and a second state (off or on) when said support is not in said second position. It is also desirable that the position sensor should put out a signal of a first potential (low or high) when said switch is in the fist state, and of a second potential (high or low) when said switch is in the second state.

The safety circuit means of the improved data transfer apparatus according to the present invention may be constituted of a pnp transistor. The safety circuit means can thus be most simplified in construction.

Another improved data transfer apparatus according to the present invention has a resistor connected between the output of the position sensor and the input of the control means. The resistor assures positive operation of the safety circuit means even if the input of the control means has a low potential because of some trouble.

As an additional feature of the present invention, the drive means for the storage medium may be fixedly mounted to the computer housing, and the cover may be made movable relative to the housing.

BRIEF DESCRIPTION OF DRAWINGS

FIG. 3 is a more detailed illustration of the mechanical construction of the CD-ROM drive 2. Depicted only in outline in FIG. 1, the stationary section 3 is herein shown to comprise a metal-made enclosure 11, a printed circuit board 12, a tray sensor 13, tray guides 14, an eject mechanism 15a, and a locking and unlocking mechanism 15b. The printed circuit board 12 is formed to include a system controller 31, a motor servo circuit 32, a signal processing circuit 35, and a safety circuit 40, all shown in FIG. 8, among other components, and fastened to the enclosure 3 by screws 16a and 16b. As diagrammatically indicated at 11a in FIGS. 4 and 5, the enclosure 3 includes a cover or lid, which is not shown in FIG. 3 to reveal the parts housed therein.

Figure 3:
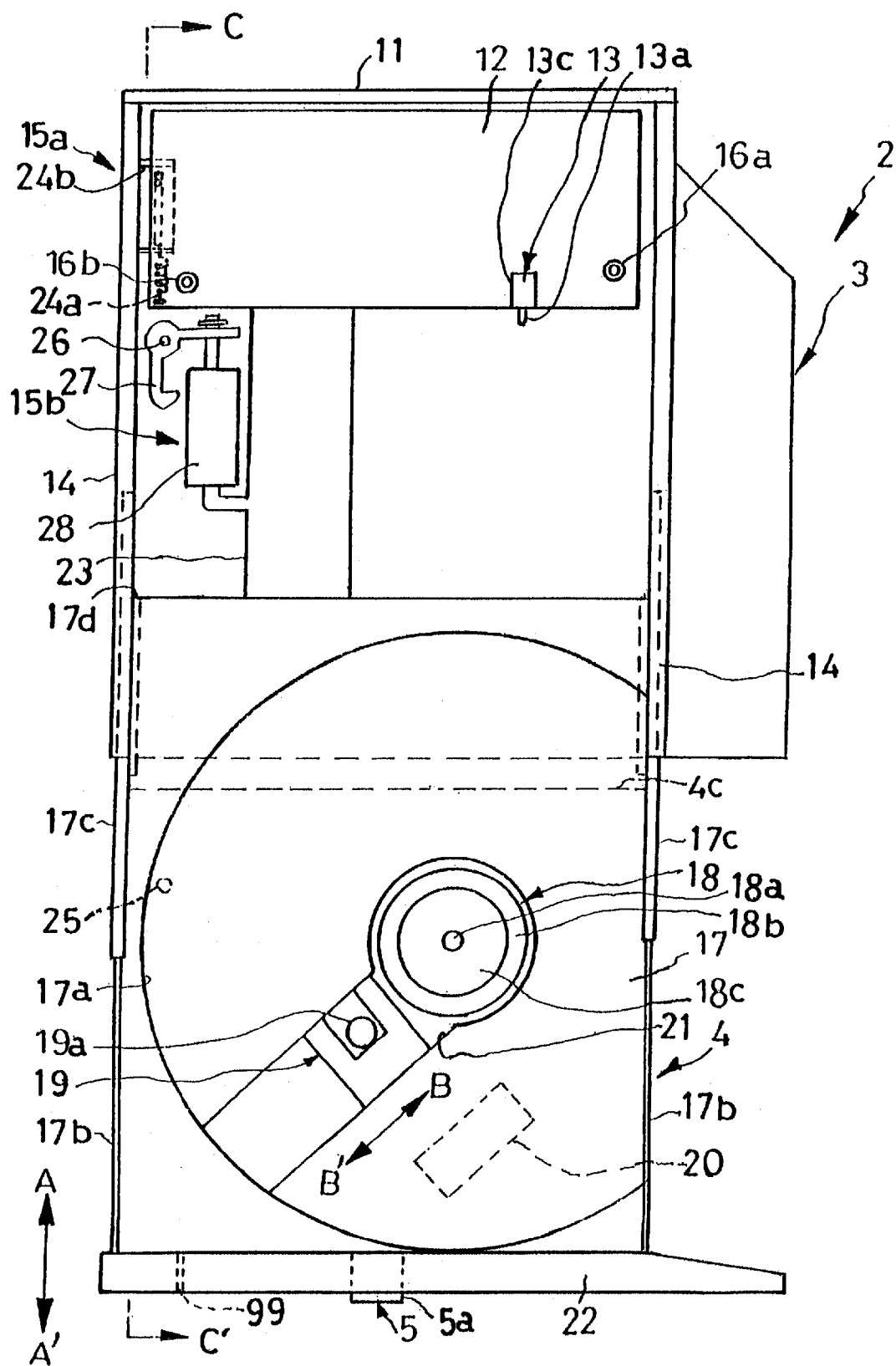
FIG. 3 is a plan view of the fist preferred form of CD-ROM drive with its cover removed.
Figure 4:
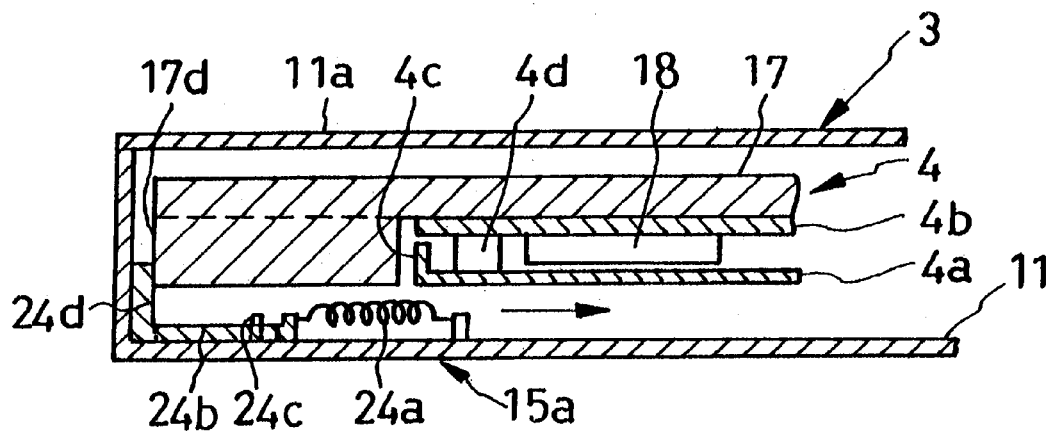
FIG. 4 is an enlarged, fragmentary section of the CD-ROM drive, taken along the line C–C' in FIG. 3 and showing the CD-ROM drive complete with the cover and with the tray inserted in the computer housing. housing 1a, allowing itself to be manually pulled further out to the disk change position of FIG. 1.
Figure 5:
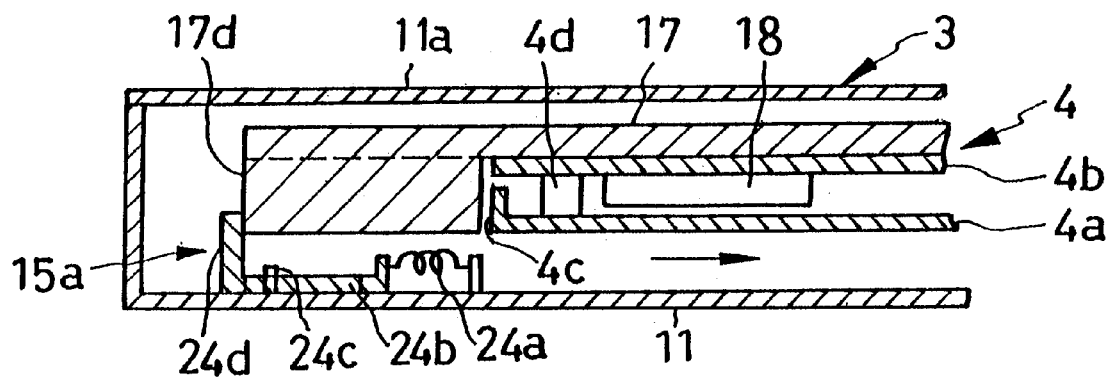

As clearly seen in FIGS. 3, 4 and 5, the movable section 4 of the CD-ROM drive 2 comprises a first and a second support plate 4a and 4b, a tray 17, a disk drive motor 18, an optical pickup assembly 19, a feed motor 20, a front bezel 22, and an eject switch 5.

For accommodating the CD-ROM (hereinafter referred to as disk) 41, FIG. 8, the tray 17 has a depression 17a formed therein approximately in the shape of the disk. As is apparent from FIGS. 4 and 5, the tray 17 is secured to the second support plate 4b. The second support plate 4b is secured to the first support plate 4a via a boss 4d. The support plates 4a and 4b are both fabricated from metal to constitute a chassis.

The familiar disk drive motor 18, optical pickup assembly 19, and feed motor 20 are all mounted to the underside of the second support plate 4b. Thus the tray 17 and the support plates 4a and 4b constitute support means for the disk drive motor 18, pickup assembly 19 and feed motor 20. The pickup assembly 19 is fed radially of the disk, indicated by the double-headed arrow B–B' in FIG. 3, by the feed motor 20.

The tray 17 is apertured at 21 to expose part of the pickup assembly 19 and part of the disk drive motor 18. More specifically, there are exposed through the aperture 21 in the tray 17 the standard objective lens 19a of the pickup assembly 19 and a turntable 18b, complete with a boss 18c for engagement with the disk, which is coupled to a spindle 18a constituting the output shaft of the disk drive motor 18.

The movable section 4 of the CD-ROM 2 is slidably supported by the, stationary section 3. A pair of rails 17b are formed on opposite sides of the tray 17 for such sliding motion of the movable section 4. The rails 17b are movable into and out of grooves formed by a pair of tray guides 14 of the stationary section 3 via known movable rails 17c. FIG. 3 shows the movable section 4 in a first position, which may be also called the eject position, disk change position, or pulled-out position. By manually pushing the front bezel 22 of the movable section 4 in this first position, the movable section will be guided by the guides 14 of the stationary section 4 to a second position shown in FIG. 4, which may also be called the data transfer position, unexposed position, or pushed-in position.

When the movable section 4 is in the first position as in FIG. 3, there is exposed from the enclosure 11 the turntable 18b, with the boss 184, which is coupled to the drive spindle 18b. The disk 41 may therefore be now either loaded on the turntable 18b, receiving the boss 18c in its central opening, or unloaded therefrom. Upon travel of the movable section 4 to the second position of FIG. 4, the cover 11a of the enclosure 11 thoroughly covers the disk 41, turntable 18b, boss 18c and pickup assembly 19, thereby protecting them and keeping them from harming the operator.

Figure 1:
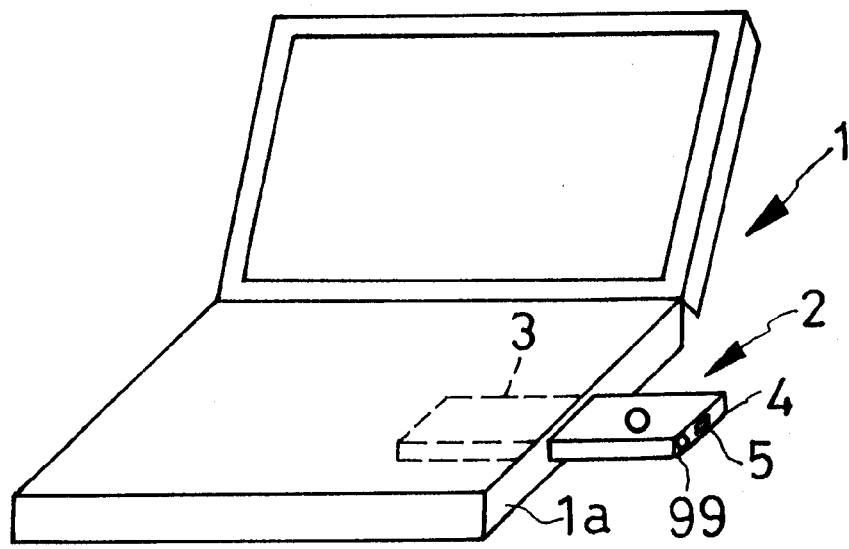
FIG. 1 shows in perspective a, personal computer equipped with a first preferred form of CD-ROM drive according to the present invention, the computer being shown with the tray ejected.
Figure 2:
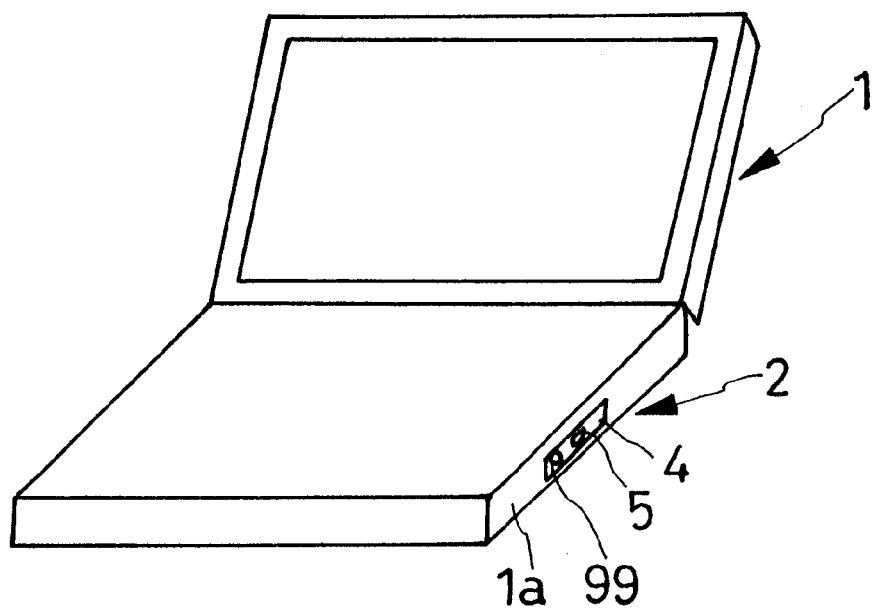
FIG. 2 is a view similar to FIG. 1 except that the tray is shown pushed into the computer housing.

As has been stated with reference to FIGS. 1 and 2, the movable section 4 is slidable in the directions of the double-headed arrow A–A' in FIG. 3 relative to the stationary section 3, in order to be selectively placed in either the first or the second position. The switch 13c constituting the tray position sensor 13 will have its actuator 13a pushed by the back 4c of the first support plate 4a of the movable section 4 when this movable section is pushed into the enclosure 11 of the stationary section 3. Thereupon the tray position sensor 18 will put out a signal indicative of the positioning of the movable section 4, including the tray 17, in the second position. Further the movable section 4 will be locked in the second position by the locking and unlocking mechanism 15b.

Then, upon actuation of the eject button 5a when the movable section 4 is received in the stationary section 3, the movable section 4 will be unlocked by the locking and unlocking mechanism 15b and travel FIG. 5 is a view similar to FIG. 4 except that the tray is shown ejected.

Figure 6:
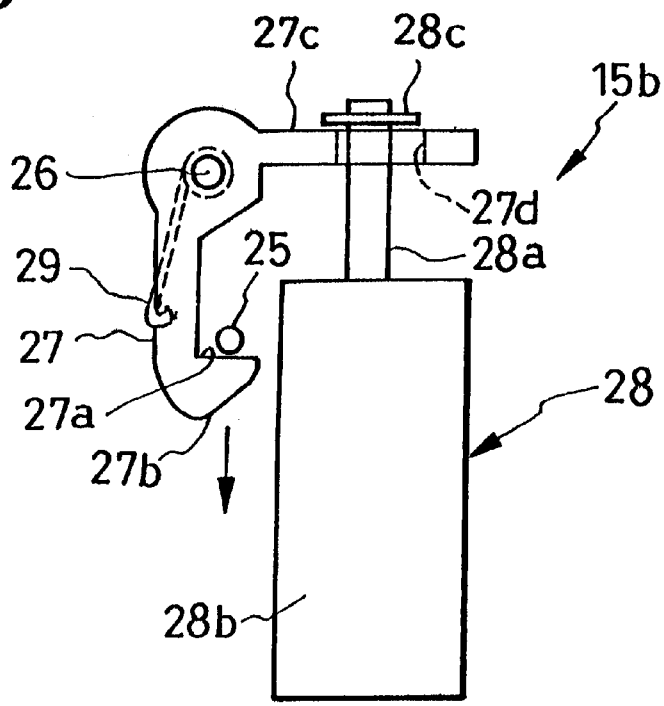

FIG. 6 is an enlarged plan view showing the locking and unlocking mechanism of FIG. 3 in a locked state.

Figure 7:
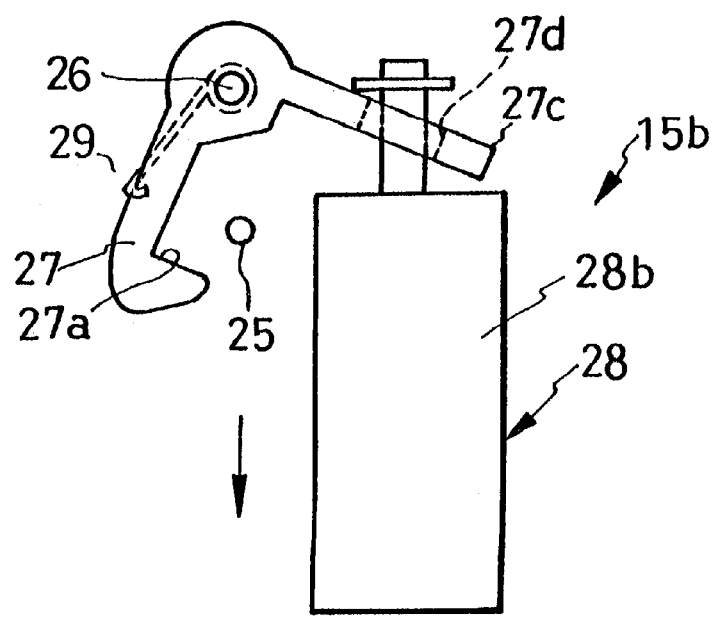

FIG. 7 is a view similar to FIG. 6 except that the locking and unlocking mechanism is shown unlocked.

Figure 8:
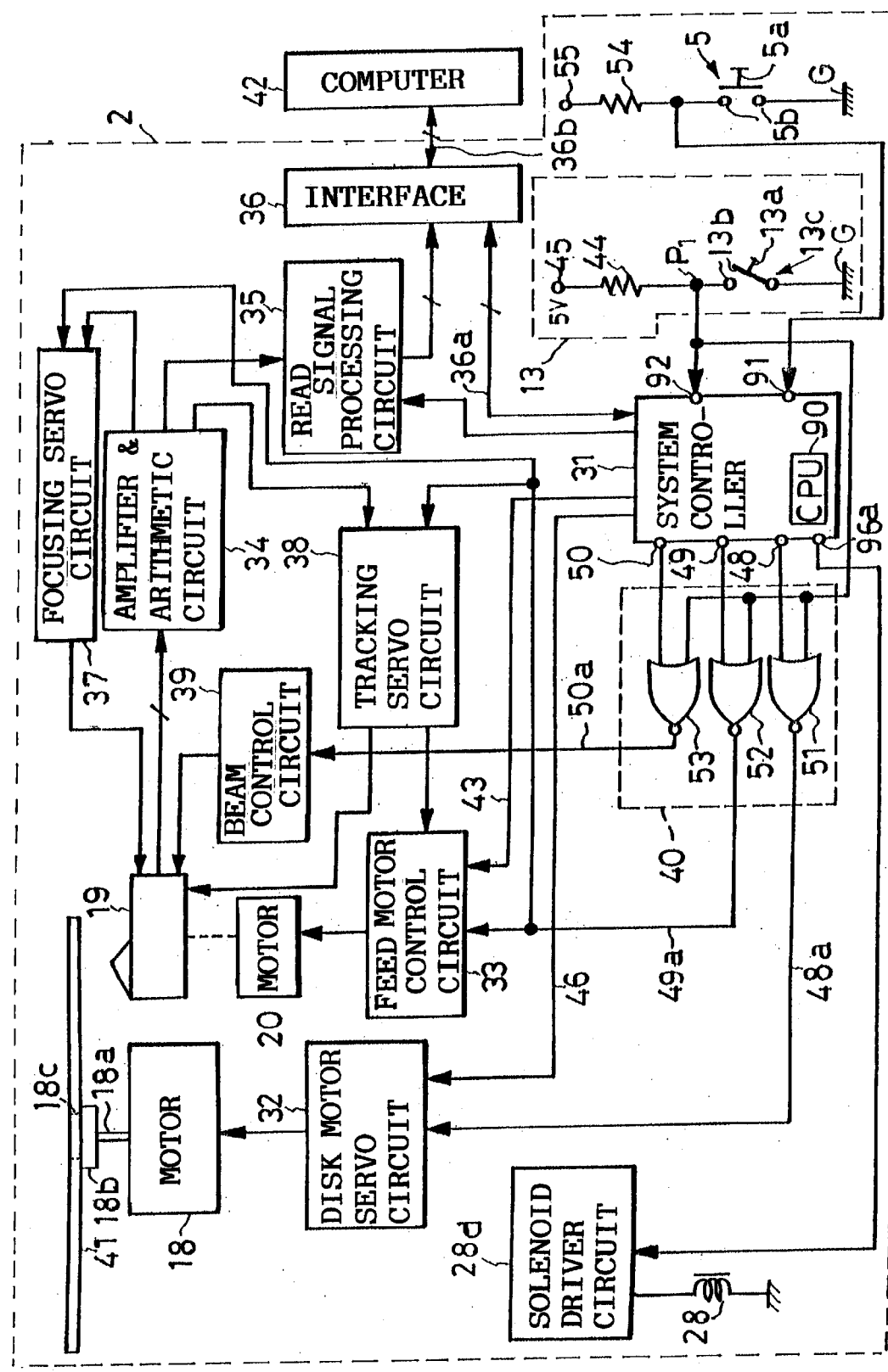

FIG. 8 is a block diagram of the first preferred form of CD-ROM drive according to the invention, shown together with the computer with which it is interfaced.

Figure 9:
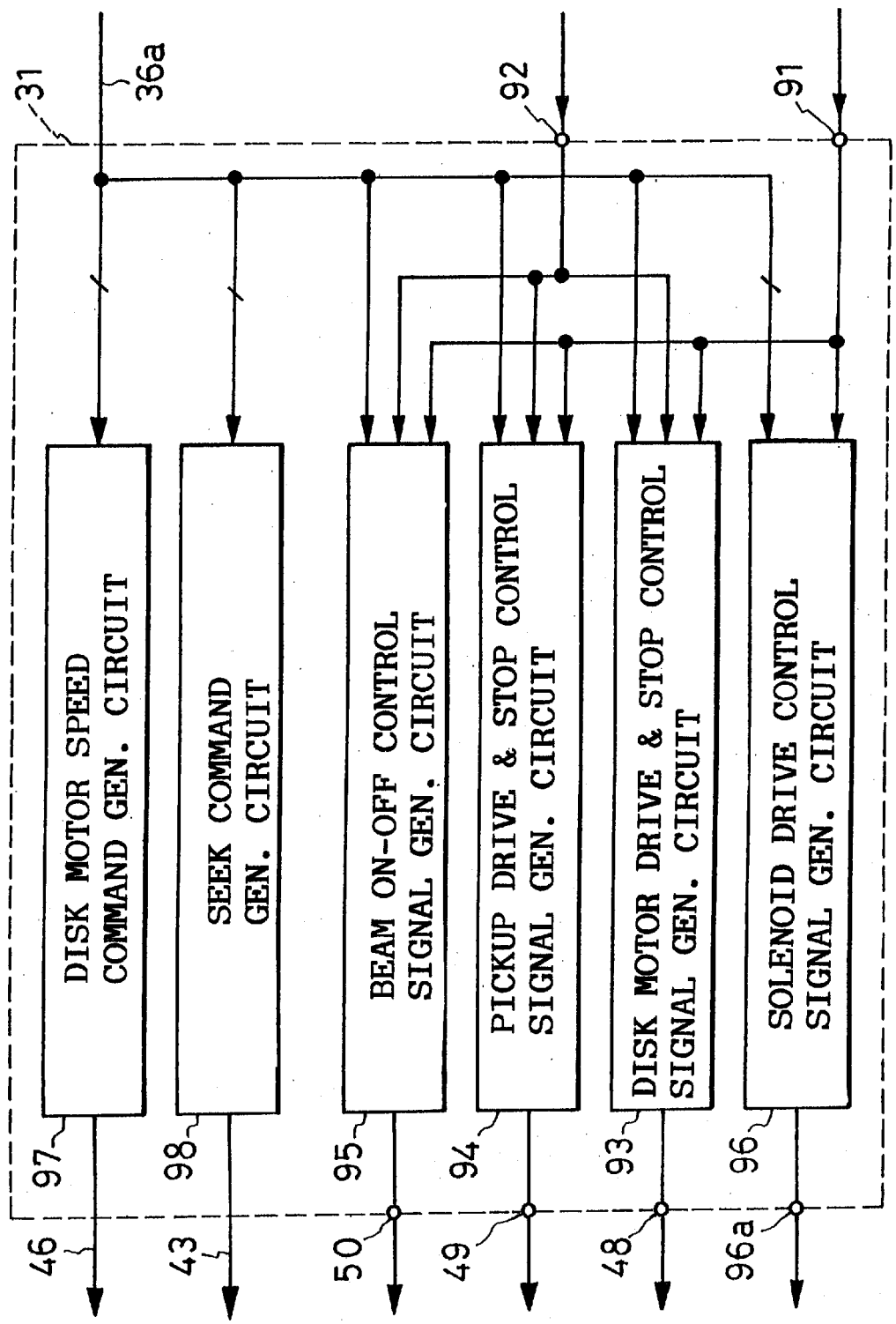

FIG. 9 is a block diagram equivalently depicting part of the system controller seen in FIG. 8.

Figure 10:
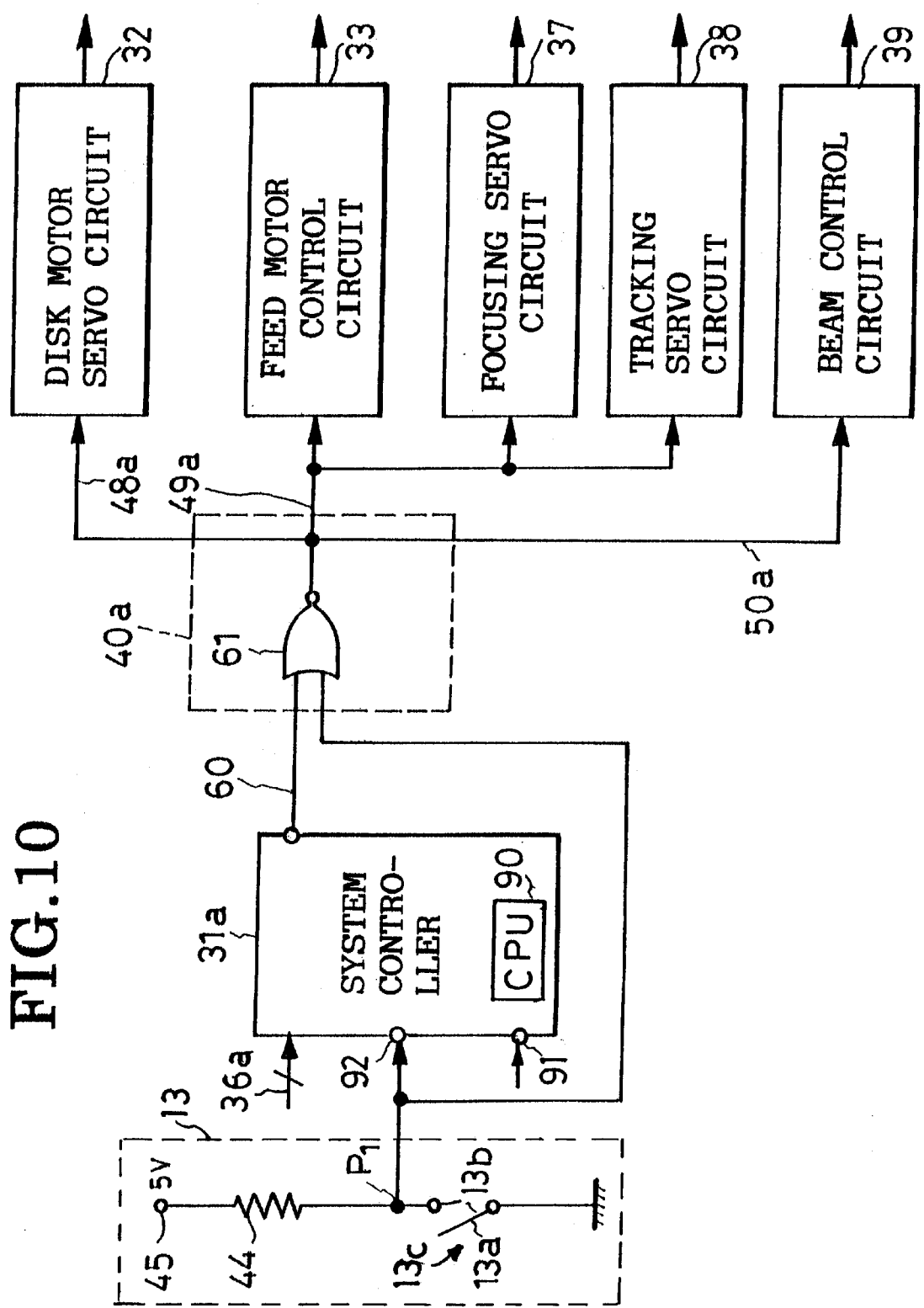

FIG. 10 is a partial block diagram of the electric circuitry of a second preferred form of CD-ROM drive according to the present invention.

Figure 11:
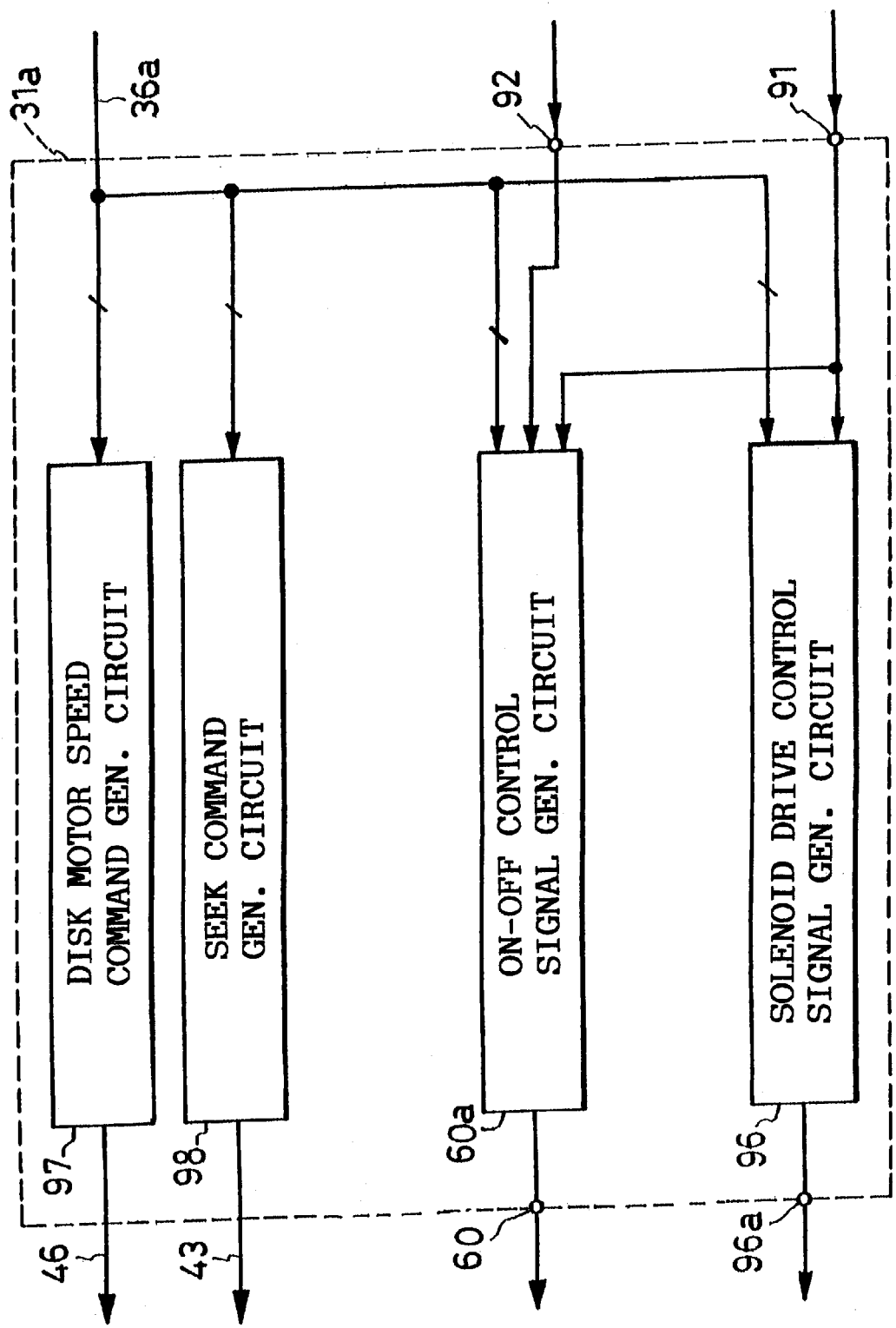

FIG. 11 is a block diagram equivalently depicting part of the system controller seen in FIG. 10.

Figure 12:
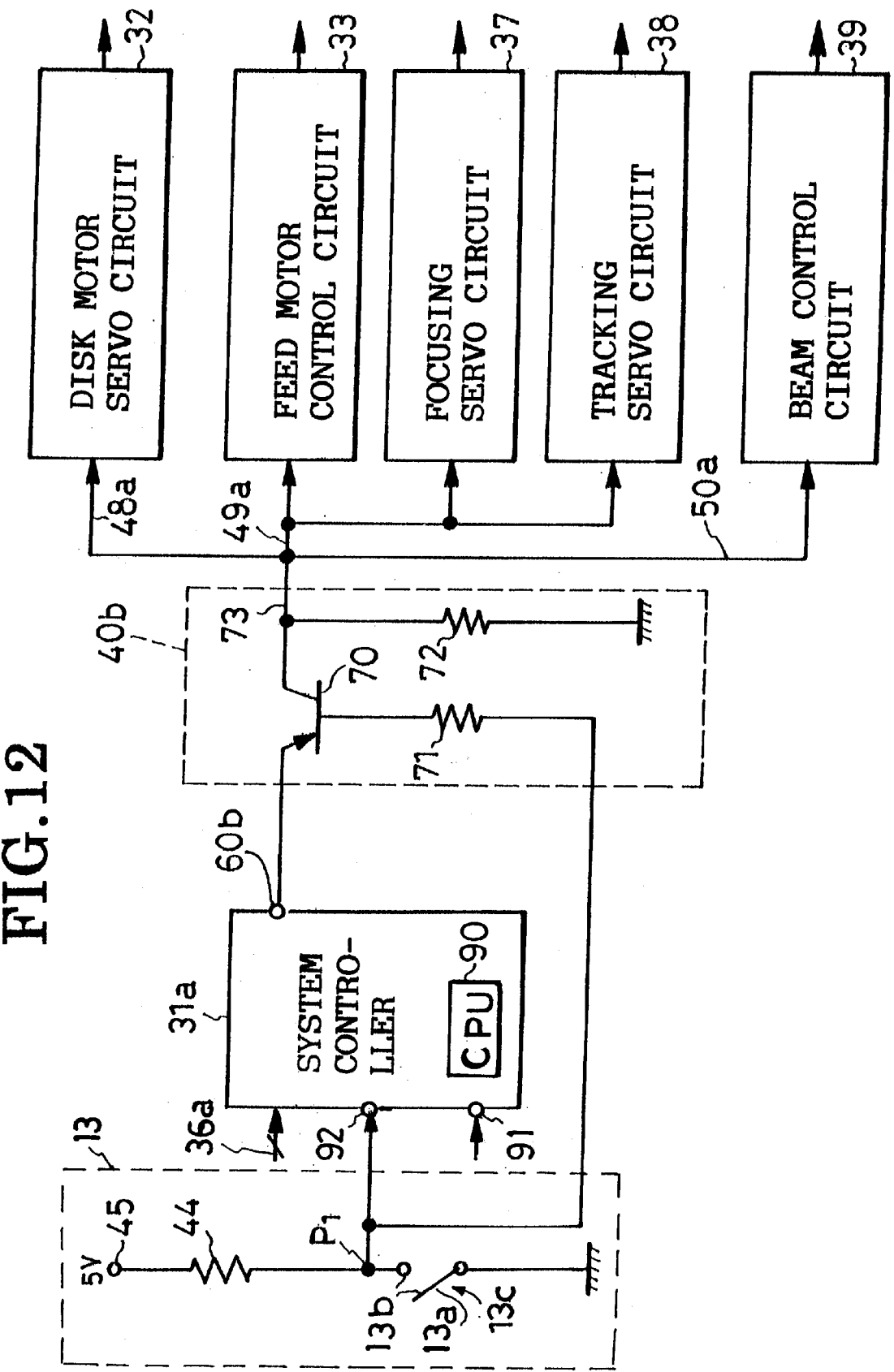

FIG. 12 is a partial block diagram of the electric circuitry of a third preferred form of CD-ROM drive according to the present invention.

Figure 13:
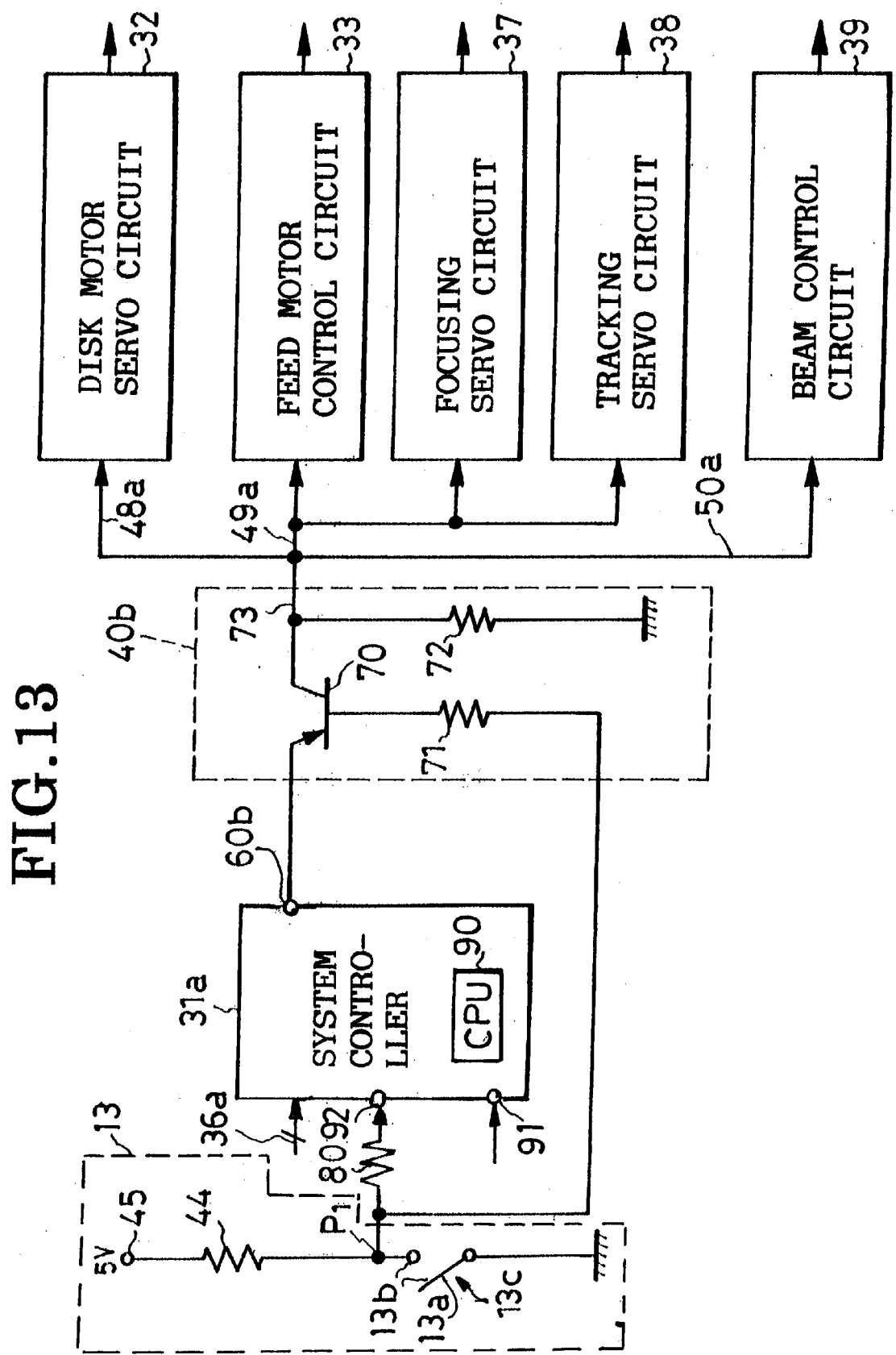

FIG. 13 is a partial block diagram of the electric circuitry of a fourth preferred form of CD-ROM drive according to the present invention.

Figure 14:
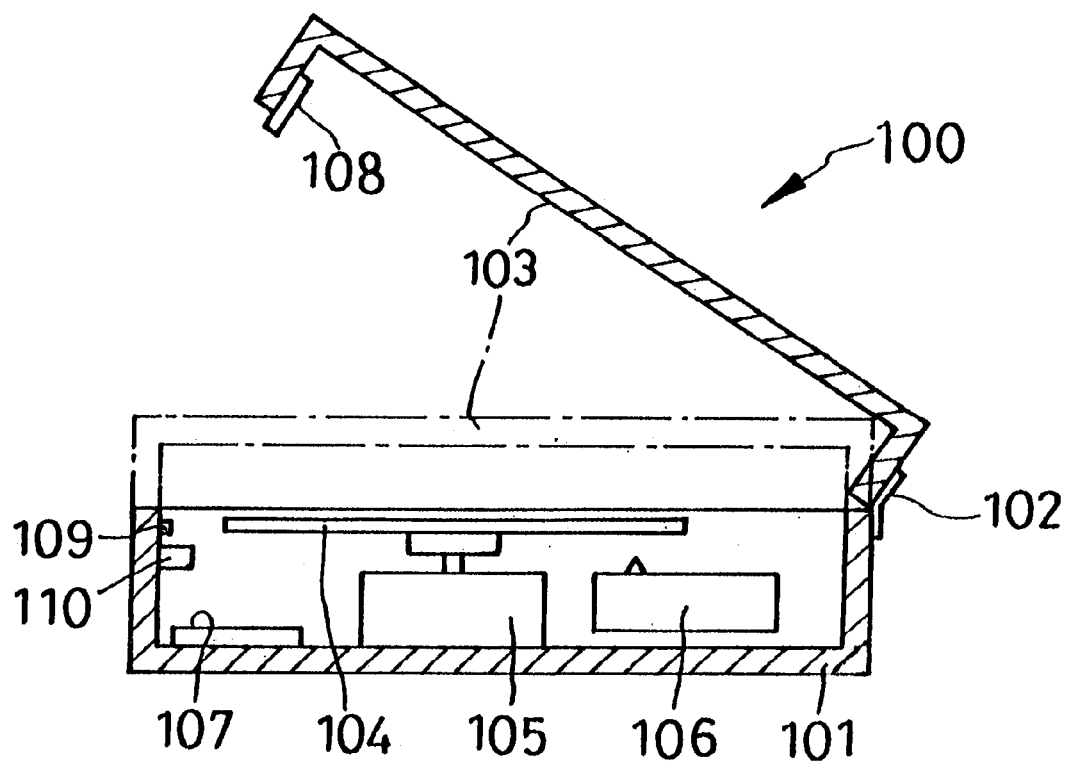

FIG. 14 is a schematic sectional view of a fifth preferred form of CD-ROM drive according to the present invention.

BEST MODES FOR CARRYING OUT THE INVENTION

As diagrammatically pictured in FIGS. 1 and 2, the notebook-size personal computer embodying the present invention incorporates a CD-ROM drive 2 as a data transfer or storage apparatus.

The CD-ROM drive 2 may be broadly classified into a stationary section 3, which is infixed in the housing 1a of the personal computer 1, and a movable section 4 which can be pulled out of the stationary section. The movable section 4 is received in the housing 1a in use, as shown in FIG. 2. For loading and unloading a record disk (CD-ROM) on and from the movable section 4, an eject switch 5 is to be operated for unlocking the movable section 4 from its FIG. 2 position. The movable section 4 when unlocked will be somewhat sprung out of the to the eject position of FIG. 5 by being pushed by the eject mechanism 15a in the direction of the arrow in FIG. 4. The output from the tray position sensor 13 will then indicate the ejection of the movable section 4 including the tray 17. The tray position sensor 13 functions in essence to sense the positions of the complete movable section 4 since the tray 17 coacts with the support plates 4a and 4b to support the disk drive motor 18.

As shown in FIGS. 3–5, the eject mechanism 15a comprises a helical tension spring 24a and a slide 24b. Guided by a guide pin 24c planted in the enclosure 11 of the stationary section 3, the slide 24b is movable in the directions of the arrow A–A' in FIG. 3. The tension spring 24a has one extremity engaged with the slide 24b, and another extremity engaged with the enclosure 11. The slide 24b is formed to include an upstanding bend 24d for engaging the back 17d of the tray 17. Thus, when the tray 17 is pushed to the second position, the slide 24b will be thereby forced to the FIG. 4 position, resulting in the extension of the tension spring 24a and the consequent storage of energy therein.

The locking and unlocking mechanism 15b will lock in the second position the movable section 4 including the tray 17. Upon being subsequently unlocked by the locking and unlocking mechanism 15b, the tray 17 together with the slide 24b will travel to the eject position of FIG. 5 by virtue of the energy that has been stored in the tension spring 24a. In this eject position the movable section 4 only slightly projects from the stationary section 3, permitting itself to be manually drawn out further to the first position of FIG. 3 for disk change. The tray 17, movable rails 17c, and tray guide 14 are so constructed and interrelated as to retain the movable section 4 in the first position, positively preventing the same from detachment from the stationary section 3.

The locking and unlocking mechanism 15b comprises a pin 25 formed on the underside of the movable section 4, a hook 27 pivotally supported by a pin 26 fixed to the enclosure 11 of the stationary section 3, and an electromagnetic actuator or an electromechanical converter shown as a solenoid 28 which is mounted to the enclosure 11 of the stationary section 3.

FIGS. 6 and 7 are more detailed illustrations of the locking and unlocking mechanism 15b, which is shown locked in FIG. 6 and unlocked in FIG. 7. The hook 27 is biased by a torsion spring 29 in a counterclockwise direction, as viewed in FIG. 6, about the pivot pin 26. Consequently, in FIG. 6, the pin 25 of the movable section 4 is engaged by the hook 27 under the bias of the torsion spring 29 and thereby locked against travel in the arrow-marked direction. The hook 27 is beveled at 27b for relative sliding engagement with the pin 25 when the tray 17 is manually pushed from its FIG. 3 position, resulting in the clockwise turn, as viewed in FIG. 6, of the hook 27 against the force of the torsion spring 29 until the hook turns back under the spring force into locking engagement with the pin.

The hook 27 is formed in one piece with an arm 27c extending from its base end in approximately right-angular relationship with the hook. The arm 27c has a slot 27d formed therein for operatively receiving the plunger 28a of the solenoid 28. Upon magnetic retraction of the plunger 28a into the body 28b of the solenoid 28, the head 28c of the plunger is to engage the arm 27c, causing the hook 27 to turn clockwise from its FIG. 6 position to that of FIG. 7 and hence to unlock the pin 25. So unlocked, the movable section 4 with the pin 25 will travel under the force of the eject spring 24c, FIG. 3, from its FIG. 2 position to the eject position of FIG. 5. It will be noted from FIGS. 6 and 7 that the head 28c of the plunger serves the additional purpose of limiting the counterclockwise turn of the hook 27.

As is apparent from the foregoing, means for positioning the movable section 4 with the tray 17 and the support plates 4a and 4b in either of the first and the second position are constituted of the pair of tray guides 14 of the stationary section 3, the pair of rails 17b of the movable section 4, and the pair of movable rails 17c, and the locking and unlocking mechanism 15b, etc.

The eject button 5a for operating the eject switch 5 is provided on the front bezel 22 which is affixed to the first support plate 4a. A depression of the eject button 5 results in the actuation of the solenoid 28. Also formed in the front bezel 22 is the well known hole 99, FIG. 3, for compulsory ejection. A suitable pin, not shown, is to be inserted into and through the hole 99 for manually unlocking the locking and unlocking mechanism 15b in cases where unlocking is not possible by the eject button 5a The electric circuitry of the CD-ROM drive 2 will become apparent from a study of FIG. 8. In addition to the eject switch 5, tray position sensor 13, eject mechanism 15a, locking and unlocking mechanism 15b, disk drive motor 18, pickup assembly 19, and feed motor 20, all shown in FIG. 3, the CD-ROM drive 2 according to the present invention comprises a solenoid driver circuit 28d, a system controller 31, a disk drive motor servo circuit 32, a feed motor control circuit 33, an amplifier and arithmetic circuit 34, a read data processing circuit 35, an interface 36, a focusing servo circuit 37, a tracking servo circuit 38, a beam intensity control circuit 39, and, according to the novel concepts of this invention, a safety circuit 40.

The disk 41, shown mounted on the turntable 18b, has a data track preformed thereon in the shape of a multiturn spiral, along which data has been conventionally recorded in the form of optical pits. The prerecorded data can be read by irradiating the data track with a laser beam emitted by the pickup assembly 19 and by receiving the beam that has been reflected back from the disk, with the pickup assembly.

The pickup assembly or transducer 19 conventionally comprises a diode laser, a photodetector composed of a plurality (e.g. six) of photodiodes, a tracking control actuator, a focusing control actuator, and so forth. Usually, the diode laser of the pickup assembly 19 is provided with the beam intensity control circuit 39, generally known as automatic power control circuit, under the control of which the laser is to emit a beam of controlled intensity.

Outputs from the photodiodes constituting the photodetector of the pickup assembly 19 are directed to the amplifier and arithmetic circuit 34. Comprising an amplifier, adders, and subtracters, this circuit 34 conventionally responds to the inputs by providing a read data signal, a tracking control signal, and a focusing control signal.

The read data signal from the amplifier and arithmetic circuit 34 is then processed by the read data processing circuit 35. Comprising a wave shaping circuit, a phase locked loop circuit, a demodulator circuit, etc., all well known in the art, the processing circuit 35 puts out binary read data for delivery to the computer 42 via the interface 36. The computer 42 is equivalent to the computer proper of the notebook computer system shown in FIGS. 1 and 2.

The focusing servo circuit 37 responds to the focusing control signal from the amplifier and arithmetic circuit 34 by providing a signal for driving the focusing actuator which operates to cause displacement of the objective lens 19a of the pickup assembly 19 in a direction normal to the surface of the disk 41 or in the axial direction of the laser beam. Incidentally, the system controller 31 is connected to the focusing servo circuit 37 for on-off control of the focusing servo and alteration of the phase compensation characteristic.

The tracking servo circuit provides a signal for driving the tracking actuator in response to the noted tracking control signal from the amplifier and arithmetic circuit 34. The tracking actuator causes displacement of the objective 19a of the pickup assembly 19 in a direction at right angles with the optical axis of the laser beam. The system controller 31 is connected to the tracking servo circuit 38 for on-off control of the tracking servo, alteration of the phase compensation characteristic, and jumping control of the laser beam.

For causing travel of the pickup assembly 19 radially of the disk 41, the feed motor control circuit 33 drives the feed motor 20 in response to the seek data on a line 43 from the system controller 31 and the feed control signal from the tracking servo circuit 38.

The eject switch 5 is shown in FIG. 8 as comprising an eject button 5a, shown also in FIG. 3, and a pair of contacts 5b to be opened and closed by the eject button. The pair of contacts 5b of the eject switch 5 are connected via a pullup resistor 54 between supply terminal 55 and ground G, so that the signal supplied from this eject switch to the first input 91 of the system controller 31 goes low upon closure of the switch, resulting in the activation of the solenoid driver circuit 28d.

The system controller 31 may take the form of a microprocessor or microcomputer including a central processor unit 90. The system controller 31 is connected to the computer 42 by way of a bus 36a, an interface 36 and a bus 36b for performing various control functions under its direction.

Connected to a second input 92 of the system controller 31 is the tray sensor 13 which comprises a sensor switch 13c and a pullup resistor 44. The sensor switch 13c comprises a pair of contacts 13b and a switch actuator 13a. One of the sensor switch contact pair 13b is connected via the 10-kilohm pullup resistor 44 to a five-volt d.c. supply terminal 45, and the other contact to the ground G. Provided between sensor switch 13c and resistor 44, the sensor output $P_1$ is connected to both the second input 92 of the system controller 31 and the safety circuit 40.

The sensor switch 13c is closed as aforesaid when the movable section 4 of the CD-ROM drive 2, including the tray 17, is pushed into the enclosure 11 of the stationary section 3, with the result that the tray detect signal on the sensor output $P_1$ goes low. The sensor switch opens upon ejection of the tray, with the result that the tray detect signal goes high. Alternatively, however, the sensor switch 13c may be so modified that the tray detect signal goes high when the tray is pushed into the enclosure 11, and low upon tray ejection. In this case either a NOT circuit may be connected between sensor output $P_1$ and safety circuit 40, or the safety circuit may be modified accordingly.

As block-diagrammatically indicated in FIG. 9, the system controller 31 with the CPU 90 may be thought of as equivalently or functionally comprising a disk drive motor drive and stop control signal generator circuit 93, a pickup drive and stop control signal generator circuit 94, a laser beam on-off control signal generator circuit 95, a solenoid drive control signal generator circuit 96, a disk drive motor speed command generator circuit 97, and a seek command generator circuit 98.

Connected to the first and second inputs 91 and 92, bus 36a, and output 48, the disk drive motor drive and stop control signal generator circuit 93 forms a signal indicative of the driving and stopping of the disk drive motor 18. More specifically, during normal operation of the controller 31, the disk drive motor drive and stop control signal generator circuit 93 provides from its output 48 the motor-on control signal or motor drive control signal of low potential, corresponding to a logical zero, in response to a disk drive command that has been supplied from the interface 36 by way of the bus 36a or to the signal that has been impressed to the second input 92 to indicate the closure of the tray sensor switch 13c. Also, the disk drive motor drive and stop control signal generator circuit 93 provides from its output 48 the motor-off control signal or motor drive control signal of high potential, corresponding to a logical one, in response to a disk stop command that has been supplied over the bus 36a, to the signal that has been applied to the first input 91 to indicate the actuation of the eject switch 5, and to the signal that has been applied to the second input 92 to indicate the opening of the tray sensor switch 13c.

The pickup drive and stop control signal generator circuit 94, which deals with the driving and stopping of the feed motor and the focusing and tracking actuators, is connected to the inputs 91 and 92, bus 36a, and output 49 and provides a signal indicative of the driving and stopping of the feed motor 20, a signal indicative of the driving and stopping of the focusing servo circuit 37, and a signal indicative of the driving and stopping of the tracking servo circuit 38. More specifically, during normal operation of the controller 31, the pickup drive and stop control signal generator circuit 94 provides from its output 49 the pick-up-on control signal of low potential, corresponding to a logical zero, in response to a drive command, supplied over the bus 36a, for the feed motor 20 or for the focusing servo circuit 27 or for the tracking servo circuit 38, or to the signal that has been impressed to the second input 92 to indicate the closure of the tray sensor switch 13c. Also, the pickup drive and stop control signal generator circuit 94 provides from its output 49 the pickup-off control signal of high potential, corresponding to a logical one, in response to a stop command, supplied over the bus 36a, for the feed motor 20 or for the focusing servo circuit 37 or for the tracking servo circuit 38, or to the signal that has been impressed to the first input 91 to indicate the actuation of the eject switch, and to the signal that has been impressed to the second input 92 to indicate the opening of the tray sensor switch 13c.

Connected to the first and second inputs 91 and 92, bus 36a, and output 50, the laser beam on-off control signal generator circuit 95 provides from the output 50 a signal indicative of the operation or nonoperation of the familiar laser diode included in the pickup assembly 19. More specifically, during normal operation of the controller 31, the laser beam on-off control signal generator circuit 95 provides from the output 50 the laser-on control signal or laser diode drive control signal of low potential, corresponding to a logical zero, in response to a beam-on command that has been supplied over the bus 36a or to the signal that has been impressed to the second input 92 to indicate the closure of the tray sensor switch 13c. Also, the laser beam on-off control signal generator circuit 95 provides from the output 50 the laser-off control signal or laser diode stop control signal of high potential, corresponding to a logical one, in response to a beam-off command that has been supplied over the bus 36a, to the signal that has been applied to the first input 91 to indicate the actuation of the eject switch 5, and to the signal that has been applied to the second input 92 to indicate the opening of the tray sensor switch 13c.

Connected to the first inputs 91, bus 36a, and output 96a, the solenoid drive control signal generator circuit 96 provides from the output 96a a drive control signal for the solenoid 28. The solenoid drive control signal is supplied from the output 96a to the solenoid driver circuit 28d. More specifically, the solenoid drive control signal generator circuit 96 delivers the solenoid drive control signal to the solenoid driver circuit 28d in response to the eject command supplied by way of the bus 36a or to the closure of the eject switch 5. The solenoid-on drive control signal for the solenoid 28 appears on the output 96a shortly after the outputs 48, 49 and 50 go low.

Connected to the bus 36a and output line 46, the disk drive motor speed command generator circuit 97 delivers speed commands for the disk drive motor 18 to the disk motor servo circuit 32 over the line 46.

Connected to the bus 36a and output line 43, the seek command generator circuit 98 sends seek commands to the feed motor control circuit 33 over the line 43.

The outputs 48, 49 and 50 of the system controller 31 are connected to the disk motor servo circuit 32, feed motor servo circuit 33, focusing servo circuit 37, tracking servo circuit 38, and beam control circuit 39 via the safety circuit 40 according to the invention.

As has been already said, the operator is subject to no harm when the tray is ejected, even with the prior art CD-ROM drive having no safety circuit 40, as long as the system controller 31 is functioning normally. However, in the event of a malfunctioning of the system controller 31 in the prior art CD-ROM drive, it has been possible that the required signals do not appear on the outputs 48, 49 and 50 when the tray position sensor 13 indicates tray ejection, resulting in continued rotation of the disk drive motor 18 with the disk 41, continued driving of the feed motor 20, continued emission of the beam from the diode laser of the pickup assembly 19. The operator has then been endangered.

The safety circuit 40, a logic circuit for eliminating the foregoing problems, comprises three NOR gates 51, 52 and 53. As is well known, the NOR gate goes high (logic one) when both of its inputs are low (logic zero), and low when either or both of its inputs are high.

The first NOR gate 51 has one input connected to the output 48 of the system controller 31, the other input to the output $P_1$ of the tray sensor 13, and the output to the disk motor servo circuit 32 by way of a line 48a. The second NOR gate 52 has one input connected to the output 49 of the system controller 31, the other input to the output $P_1$ of the tray sensor 13, and the output to the feed motor control circuit 33 and the focusing servo circuit 37 and the tracking servo circuit 38 by way of a line 49a. The third NOR gate 53 has one input connected to the output 50 of the system controller 31, the other input to the output $P_1$ of the tray sensor 13, and the output to the beam control circuit 39 via a line 50a.

It is understood that the disk motor servo circuit 32, feed motor control circuit 33, focusing servo circuit 37, tracking servo circuit 38, and beam control circuit 39 are active when the lines 48a, 49a and 50a are high, and inactive when the lines 48a, 49a and 50a are low.

Functioning normally, the system controller 31 will produce drive commands of low potential on its outputs 48, 49 and 50 for driving or activating the disk motor 18, feed motor 20, focusing servo circuit 37, tracking servo circuit 38, and beam control circuit 39. The outputs 48, 49 and 50 of the system controller 31 will go high, thereby terminating the production of the drive commands, when the eject switch 5, FIG. 8, is closed by manipulation of the eject button 5a. The output lines 48a, 49a and 50a of the NOR gates 51, 52 and 53 will all be of low potential irrespective of the output from the sensor 13 if the eject button 5a is manipulated when the system controller is functioning normally. Consequently, when the tray is ejected, the disk motor servo circuit 32, feed motor servo circuit 33, focusing servo circuit 37, tracking servo circuit 38, and beam control circuit 39 will all be turned off, and the disk motor 18, the feed motor 20, and the focusing and tracking actuators and laser of the pickup assembly 19 will also go off.

Further, upon actuation of the eject switch 5 during the normal functioning of the system controller 31, this controller will produce from its output 96a the solenoid drive control signal for activating the solenoid 28 shortly after the disk drive motor 18 and so forth have been turned off. The solenoid 28 will then operate to unlock the locking and unlocking mechanism 15b and hence to permit the movable section 4 including the tray 17 to be ejected from its FIG. 5 position under the force of the eject spring 24a.

The disk drive motor 18 and so forth are out of operation when the tray 17 with the disk thereon is ejected. There is no danger to the operator.

The system controller 31 may malfunction, and its outputs 48, 49 and 50 may remain low, instead of going high as required, when the eject switch is turned on. The malfunctioning system controller 31 may nevertheless produce from its output 96a the solenoid drive control signal for actuating the solenoid 28. In this case the solenoid 28 will operate before the disk drive motor 18 and feed motor 20 go out of rotation, resulting in the unlocking, and consequent ejection, of the tray by the locking and unlocking mechanism 28.

Upon tray ejection, however, the switch 13c of the tray position sensor 13 will open, with the result that the sensor output $P_1$ goes high to indicate a logical one. Impressed to the NOR gates 51, 52 and 53 of the safety circuit 40, the high sensor output will cause these gates to go low in the face of low outputs from the system controller 31. The low outputs from the safety circuit 40 will set both disk drive motor 18 and feed motor 20 out of rotation and disable the beam control circuit 39 and so forth immediately after the tray 17 starts traveling toward the FIG. 3 position. Thus is the operator's safety assured even in the event of the malfunctioning of the system controller 31.

Operator safety is assured, too, when the tray is ejected by insertion of a pin into the compulsory eject hole 99 for unlocking the locking and unlocking mechanism 15b with the CD-ROM drive 2 held electrically powered on. Even when the tray is compulsorily ejected, with the outputs 48, 49 and 50 of the malfunctioning system controller held low, the switch 13c of the tray position sensor 13 will open, thereby making the sensor output $P_1$ go high, as the tray starts to be ejected. The high sensor output will cause the NOR gates 51, 52 and 53 to go low regardless of the states of the outputs 4, 49 and 50 of the system controller 31. Thus the disk drive motor 18, feed motor 20, beam control circuit 39 and so forth will all be turned off for operator safety.

When the tray 17 is in the second position, that is, received in the computer housing, on the other hand, the outputs 48, 49 and 50 of the system controller 31 are all low, and so is the output $P_1$ of the sensor 13. Since both inputs to the NOR gates 51, 52 and 53 are low, their outputs are all high, permitting the rotation of both disk drive motor 18 and pickup feed motor 20, and the normal operation of the associated circuits.

Another preferred form of CD-ROM drive according to the present invention will now be described with reference to FIG. 10. In this figure, as well as in FIGS. 11–14 to be referred to subsequently, parts having corresponding parts in FIGS. 1–8 will be identified by like reference characters, and their description omitted. FIGS. 1–8 will also be referred to for a discussion of FIGS. 10–14.

The CD-ROM drive shown in part in FIG. 10 is of the same construction as that of FIGS. 1–8 except for a modified system controller 31a and a modified safety circuit 40a.

The system controller 31a of FIG. 10 differs from the FIG. 8 system controller 31 only in having one output 60 instead of the three outputs 48, 49 and 50. FIG. 11 is a block diagram equivalently or functionally representing the FIG. 10 system controller 31a.

A comparison of FIGS. 9 and 11 will show that the FIG. 11 system controller 31a has an on-off control signal generator circuit 60a in place of the disk motor drive and stop control signal generator circuit 93, pickup drive and stop control signal generator circuit 94 and beam on-off control signal generator circuit 95 of the FIG. 9 system controller 31. Connected to the inputs 91 and 92 and the bus 36a, the on-off control signal generator circuit 60a puts out a signal that goes low for activating the disk drive motor 18, feed motor 20, focusing servo circuit 37, tracking servo circuit 38, and light beam control circuit 39 of FIG. 8, and high for inactivating these components.

The FIG. 10 safety circuit 40a has but one NOR gate 61 having one input connected to the output 60 of the system controller 31a, and another input connected to the output $P_1$ of the sensor 13. The output of the NOR gate 61 is connected to three on-off control lines 48a, 49a and 50a.

Both inputs to the NOR gate 61 are low when the output 60 of the system controller 31a goes low for activating the disk motor 18, feed motor 20, etc., while the switch 13c of the sensor 13 is closed as a result of the insertion of the tray 17 into the computer housing. The NOR gate 61 will then provide high outputs on its output lines 48a, 49a and 50a.

When the signal indicative of the closure of the eject switch 5, FIG. 8, is impressed to the first input 91 of the system controller 31a, its output 60 will go high, making the NOR gate 61 go low, with the consequent deactuation of the disk motor 18, feed motor 20 and so forth. Then the system controller 31a will apply a drive, command to the solenoid driver circuit 28d, FIG. 8, thereby causing ejection of the movable section 4 including the tray 17.

The disk 41 and motors 18 and 20 are out of rotation when the tray is ejected as above. The system controller 31a may hold its output 60 low as a result of malfunctioning when the eject switch 5, FIG. 8, is closed. But even then the NOR gate 61 will go low if the sensor output $P_1$, FIG. 10, is high. Both motors 18 and 20 will then be set out of rotation for the sake of operator safety just as in the cause of FIG. 8.

Even if the system controller 31a malfunctions when the tray is compulsorily ejected by insertion of a pin in the eject hole 99, FIG. 3, operator safety is assured just as in the case of tray ejection by manipulation of the eject switch 5. The FIG. 10 CD-ROM drive gains the advantage of greater simplicity in the construction of the safety circuit 40a.

FIG. 12 shows part of a third preferred form of CD-ROM drive according to the present invention. The FIG. 12 CD-ROM drive is akin to that of FIG. 10 except for a modified system controller 31b and a modified safety circuit 40b. The FIG. 12 system controller 31b differs from the FIG. 10 system controller 31a only in the signal polarity of its output 60b. More particularly, the FIG. 12 system controller 31b goes high for activating the motors 18 and 20, etc., and low for inactivating them.

The safety circuit 40b comprises a pnp transistor 70 and resistors 71 and 72. The transistor 70 has its emitter connected to the output 60b of the controller 31b, its base connected to the output line 73 of the safety circuit 40b, and its base connected to the output $P_1$ of the sensor 13 via the resistor 71 by way of a current limiter. The other resistor 72 is connected between the collector of the transistor 70 and the ground.

The output 60b of the FIG. 12 system controller 31b is high (approximately five volts) when the output $P_1$ of the tray position sensor 13 is low or at ground potential. As a result, a forward bias is applied between the emitter and base of the transistor 70. The resulting conduction of this transistor makes its collector, and hence the output line 73 of the safety circuit, high, and a signal is supplied over the lines 48a, 49a and 50a for activating the disk motor servo circuit 32, feed motor control circuit 33, focusing servo circuit 37, tracking servo circuit 38, and beam control circuit 39.

When the output 60b of the system controller 31b goes low, on the other hand, the transistor 70 is turned off. As the output line 73 of the safety circuit 40b thus goes low, the disk motor servo circuit 32, feed motor control circuit 33, focusing servo circuit 37, tracking servo circuit 38, and beam control circuit 39 are all inactivated.

Upon possible malfunctioning of the system controller 31b, its output 60 may be high (approximately five volts) even though the output $P_1$ of the sensor 13 is high (approximately five volts), indicating tray ejection. Then the transistor 70 remains nonconductive as its emitter-base voltage is less than its threshold value. The output line 73 of the safety circuit 40b is then low, and so are the output lines 48a, 49a and 50a for the safety of the operator.

FIG. 13 shows part of a fourth preferred form of CD-ROM drive according to the present invention. The FIG. 13 CD-ROM drive is analogous with that of FIG. 12 except for the addition of a 100-kilohm resistor 80.

In FIG. 13 the 100-kilohm resistor 80 is connected between the sensor output $P_1$ and the second input 92 of the system controller 31b, This resistor 80 must have a resistance value sufficiently higher than that (10 kilohms) of the pullup resistor 44. With the provision of the resistor 80, the transistor 70 can be made off even if the second input 92 is low when the switch 13c of the tray position sensor 13 is off, because of the malfunctioning of the system controller 11b.

More specifically, in FIG. 13, if the input 92 of the malfunctioning system controller 31b gains a ground potential when the switch 13c of the sensor 13 is off, the sensor output $P_1$ has a potential of 4.5 volts, a division of five volts from the supply terminal 45 by the 10-kilohm resistor 44 and the 100-kilohm resistor 80. The base potential of the transistor 70 is also 4.5 volts. As a result, even if the output 60 of the malfunctioning system controller is high (five volts), the emitter-base voltage of the transistor 70 is less than its threshold value. The transistor 70 is therefore off, and its output line 73 is low, inactivating the disk motor 18, feed motor 20 and so forth for operator safety.

As long as the system controller 31b is functioning normally, its input 92 is low when the switch 13c of the sensor 13 is on, and high when the sensor switch is off. The resistor 80 does not interfere with the desired operation of the system controller.

The resistor 80 of FIG. 13 could also be connected in the same position in FIGS. 8 and 10.

The resistance value of the resistor 30 may be suitably determined in the range capable of holding the sensor output $P_1$ high when the input 92 of the system controller 31b is low.

FIG. 14 is a schematic illustration of a fifth preferred form of data transfer apparatus 100 according to the invention. The data transfer apparatus 100 comprises a housing 101 which forms a stationary part or support, and a cover or lid 103 hinged at 102 to the housing. A motor 105 for driving a disklike storage medium 104 is mounted within the housing 101, in which there are also mounted an optical pickup assembly 106, the controller 31 of FIG. 8, control circuitry 107 including a safety circuit according to the present invention, a feed motor, not shown, and other means.

The lid 103 has an engaging member 108 for engagement with a projection 109 on the housing 101. The lid 103 is pivotable between the open position (first position) indicated by the solid lines in FIG. 14 and a closed position (second position) indicated by the broken lines. When closed the lid 103 is locked by engagement of the engaging member 108 with the projection 109. When unlocked by unlocking means, not shown, the lid 103 may be manually opened. A position sensor 110 senses whether the. lid 103 is in the closed position or not. The position sensor 110 performs the same functions as the tray position sensor 13 of FIGS. 3 and 8.

The control circuitry 107 is substantially of the same construction as in FIG. 8 except that the FIG. 8 motor 18 and position sensor 13 are replaced by the FIG. 14 motor 105 and position sensor 110. Thus the control circuitry 107 comprises an equivalence of the FIG. 8 safety circuit, which operates just like its FIG. 8 counterpart in response to the output from the sensor 110. More specifically, when the sensor 110 senses the opening of the lid 103, the safety circuit stops the motor 105 regardless of the malfunctioning of an equivalence of the FIG. 8 controller 31. Operator safety is thus assured. The lid 103 may be sprung to the open position.

Industrial Applicability

As is apparent from the foregoing, the data transfer apparatus having the safety circuit according to the invention is applicable to use as a portable personal computer or a small-size desktop personal computer.

What is claimed is:

1. A data transfer apparatus characterized by comprising:
   drive means (18) for driving a replaceable data storage medium (41);
   support means (4a, 4b and 17) supporting said drive means (18);
   cover means (11 and 11a) for enclosing said drive means (18) and the data storage medium (41) mounted to said drive means;
   positioning means (14, 17b, 17c and 15b) for selectively positioning said support means (4a, 4b and 17) in a first position, where said drive means (18) is at least partly exposed from said cover means (11 and 11a) so as to permit the data storage medium (41) to be mounted to and dismounted from said drive means, and a second position where said drive means (18) is covered by said cover means (18 and 18a);
   a position sensor (13) for sensing whether said support means (4a, 4b and 17) is in said second position or not;
   drive command generator means (36 and 36a) for generating a command for driving said drive means;
   control means (31, 31a or 31b) connected to said drive means (18) and said position sensor (13) and said drive command generator means (36 and 36a) for setting said drive means (18) in operation when said position sensor (13) provides a signal indicating that said support means (4a, 4b and 17) is in said second position and, at the same time, when said drive command generator means (36 and 36a) generates the drive command for said drive means, and for setting said drive means (18) out of operation when said position sensor (13) provides a signal indicating that said support means (4a, 4b and 17) is not in said second position; and
   safety circuit means (40, 40a or 40b) connected to said control means (31, 31a or 31b) and said drive means (18) and said position sensor (13) for providing to said drive means (18) a signal for stopping said drive means regardless of outputs from said control means (31, 31a or 31b) when said position sensor (13) provides a signal indicating that said support means (4a, 4b and 17) is not in said second position.

2. A data transfer apparatus as claimed in claim 1, characterized in that said position sensor (13) comprises:
   a switch (13c) gaining a first state when said support means (4a, 4b and 17) is in said second position, and a second state when said support means (4a, 4b and 17) is not in said second position;
   a pullup resistor (44) connected between one contact of said switch (13c) and a direct current supply terminal (45);
   means for grounding another contact of said switch (13c); and
   an output ($P_1$) connected between said switch (13c) and said pullup resistor (44);
   said position sensor producing from aid output ($P_1$) a signal that has a first potential when said switch (13c) is in said first state, and a second potential when said switch (13c) is in said second state.

3. A data transfer apparatus as claimed in claim 1, characterized in that said position sensor (13) comprises:
   a switch (13c) adapted to be closed when said support means (4a, 4b and 17) is in said second position, and open when said support means (4a, 4b and 17) is not in said second position;

a pullup resistor (44) connected between one contact of said switch (13c) and a direct current supply terminal (45);

means for grounding another contact of said switch (13c); and an output ($P_1$) connected between said switch (13c) and said pullup resistor (44);

said position sensor producing from said output ($P_1$) a signal that is low when said switch (13c) is closed, and high when said switch (13c) is open.

4. A data transfer apparatus as claimed in claim 3, characterized in that said control means (31 or 31a) has an output (48 or 60) for providing a signal that, during the normal operation of said control means, goes low for activating said drive means (18) and high for inactivating said drive means (18), that said safety circuit means (40) comprises a NOR gate (51 or 61) having a first input and a second input, said first input of said NOR gate (51 or 61) being connected to said output (48 or 60) of said control means (31 or 31a), said second input of said NOR gate being connected to said output ($P_1$) of said position sensor, and that said NOR gate (51 or 61) puts out a control signal for activating and inactivating said drive means (18).

5. A data transfer apparatus as claimed in claim 3, characterized in that said control means (31b) has an output (60b) for providing a signal that, during the normal operation of said control means, goes high for activating said, drive means (18) and low for inactivating said drive means (18), that said safety circuit means (40b) comprises a pnp transistor (70) and a first and a second resistor (71 and 72), said transistor having an emitter connected to said output (60b) of said control means (30b), said first resistor being connected between said output ($P_1$) of said position sensor and the base of said transistor (70), said second resistor (72) being connected between the collector of said transistor (70) and the ground, and that said transistor produces from its collector a control signal for activating and inactivating said drive means (18).

6. A data transfer apparatus as claimed in claim 5, characterized in that a resistor (80) which is greater in resistance value than said pullup resistor (44) is connected between the output ($P_1$) of said position sensor (13) and the input (92) of said control means (31b).

7. A data transfer apparatus as claimed in claim 1, 2, 3, 4, 5 or 6, characterized in that said data storage medium is a disklike medium capable of having data to be written and/or read thereon, that said drive means (18) is a motor for imparting rotation to said disklike medium, that said cover is a housing (11 and 11a) of said data transfer apparatus, and that said support means (4a, 4b and 17) is slidably mounted to said container (11 and 11a) for movement between said first and said second position.

8. A data transfer apparatus as claimed in claim 1, 2, 3, 4, 5 or 6, characterized in that said control means (31) is a microcomputer.

9. A data transfer apparatus characterized by comprising:

drive means (105) for driving a replaceable data storage medium (104);

support means (101) supporting said drive means (105);

a cover (103) for enclosing said drive means (105) and the data storage medium (104) mounted to said drive means;

positioning means (102, 108 and 109) for selectively positioning said cover (103) in a first position, where said drive means (18) is at least partly exposed so as to permit the data storage medium (104)) to be mounted to and dismounted from said drive means (105), and a second position where said drive means (105) is covered by said cover (103);

a position sensor (110) for sensing whether said cover (103) is in said second position or not;

drive command means (36 and 36a) for generating a command for driving said storage medium (104);

control means (31, 31a or 31b) connected to said drive means (105) and said position sensor (110) and said drive command means (36 and 36a) for setting said drive means (105) in operation when said position sensor (110) provides a signal indicating that said cover (103) is in said second position and, at the same time, when said drive command means (36 and 36a) generates the drive command for activating said drive means (105), and for setting said drive means (105) out of operation when said position sensor (110) provides a signal indicating that said cover (103) is not in said second position; and safety circuit means (40, 40a or 40b) connected to said control means (31, 31a or 31b) and said drive means (105) and said position sensor (110) for providing to said drive means (105) a signal for stopping said drive means regardless of outputs from said control means (31, 31a or 31b) when said position sensor (110) provides a signal indicating that said cover (103) is not in said second position.

* * * * *

UNITED STATES PATENT AND TRADEMARK OFFICE
CERTIFICATE OF CORRECTION

PATENT NO. : 6,426,873 B1
DATED : July 30, 2002
INVENTOR(S) : Minoru Minase, Susumu Niinuma and Hiroomi Watanabe It is certified that error appears in the above-identified patent and that said Letters Patent is hereby corrected as shown below:

Column 1,
Line 21, delete "feedling" and insert -- feeding -- therefor;

Column 2,
Line 22, insert -- object of -- after "an";

Column 3,
Line 26, delete "a," and insert -- a -- therefor;

Column 4,
Line 15, delete "the," and insert -- the -- therefor;
Line 30, delete "184" and insert -- 18c -- therefor;
Line 31, delete "18b" and insert -- 18a -- therefor;

Move text within Column 3, Line 37, beginning with "housing 1a," thru Column 4, Line 55, ending with "and travel" to Column 5, Line 31, between the words "of the" and "to the eject";

Column 13,
Line 48, delete "the." and insert -- the -- therefor;

Column 15,
Line 27, delete the "said," and insert -- said -- therefor.

Signed and Sealed this

Seventeenth Day of February, 2004

JON W. DUDAS
*Acting Director of the United States Patent and Trademark Office*